United States Patent
Thomas et al.

(10) Patent No.: US 9,596,135 B1
(45) Date of Patent: Mar. 14, 2017

(54) CONFIGURING NEW NODES FOR USING A STORAGE SYSTEM MANAGED BY A UNIFIED STORAGE MANAGER

(71) Applicant: Red Hat, Inc., Raleigh, NC (US)

(72) Inventors: Nishanth Thomas, Bangalore (IN); Kanagaraj Mayilsamy, Tirupur (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/253,069

(22) Filed: Aug. 31, 2016

(51) Int. Cl.
  *G06F 15/16* (2006.01)
  *H04L 12/24* (2006.01)
  *H04L 29/08* (2006.01)

(52) U.S. Cl.
  CPC .......... *H04L 41/0806* (2013.01); *H04L 41/12* (2013.01); *H04L 67/1097* (2013.01)

(58) Field of Classification Search
  CPC .. H04L 41/0806; H04L 41/12; H04L 67/1097
  See application file for complete search history.

(56) References Cited

U.S. PATENT DOCUMENTS

| | | | | |
|---|---|---|---|---|
| 6,963,981 B1 * | 11/2005 | Bailey | ...................... | G06F 8/60 726/22 |
| 7,668,938 B1 * | 2/2010 | Phillips | ..................... | G06F 8/60 709/220 |
| 8,037,260 B2 | 10/2011 | Shitomi et al. | | |
| 8,050,242 B2 * | 11/2011 | Lipford | .................. | H04W 8/24 370/310 |
| 8,122,114 B1 | 2/2012 | Krishnamoorthy et al. | | |
| 8,433,877 B2 | 4/2013 | Bargoti et al. | | |
| 8,516,044 B1 | 8/2013 | Chakraborty et al. | | |
| 8,612,553 B2 * | 12/2013 | Phillips | ................. | G06F 9/4406 707/968 |

(Continued)

FOREIGN PATENT DOCUMENTS

CN    104580221 A    4/2015

OTHER PUBLICATIONS

Chen, Keven et al., "Automatic Configuration of a Distributed Storage System", http://www.ece.ubo.ca/~matei/EECE571/PastReports/2010-SelfConfig.pdf, 5 pages, Apr. 2010 (5 pages).

(Continued)

*Primary Examiner* — Moustafa M Meky
(74) *Attorney, Agent, or Firm* — Lowenstein Sandler LLP (57) ABSTRACT

Systems and methods for configuring new nodes for using a storage system managed by a unified storage manager (USM) are disclosed. An example method may comprise detecting, by a processing device executing a unified storage manager (USM), a connection of a machine to the USM, invoking a provisioning component of the USM to initiate a provisioning process for the machine, utilizing, via the provisioning process, an external provisioning service to cause a bootstrapping process to execute on the machine, the bootstrapping process to install an operating system (OS) on the machine and to execute a kickstart file on the machine, responsive to execution of the kickstart file, performing a handshake process with the machine to establish a communication channel between the USM and the machine, and receiving, via the established communication channel, an availability status of the machine as a storage node for storage services managed by the USM.

20 Claims, 5 Drawing Sheets (56) References Cited

U.S. PATENT DOCUMENTS

| | | | |
|---|---|---|---|
| 8,700,832 B1 | 4/2014 | Ramakrishnan et al. | |
| 9,424,017 B2* | 8/2016 | Macken | G06F 8/61 |
| 2002/0091805 A1* | 7/2002 | Phillips | G06F 9/4406 |
| | | | 709/220 |
| 2010/0058325 A1* | 3/2010 | Macken | G06F 8/61 |
| | | | 717/174 |
| 2013/0097400 A1 | 4/2013 | Shitomi et al. | |
| 2013/0332610 A1 | 12/2013 | Beveridge | |
| 2014/0075172 A1* | 3/2014 | Knichel | G06F 9/4401 |
| | | | 713/2 |
| 2015/0237077 A1* | 8/2015 | Suryavanshi | H04L 65/1083 |
| | | | 709/204 |

OTHER PUBLICATIONS

"Installing and Using Contrail Storage", http://www.juniper.net/techpubs/en_US/contrail2.0/topics/task/configuration/storage-support-vnc.html, 12 pages, Modified: Aug. 19, 2015 (12 pages).

Hitachi Data Systems, "Hitachi Unified Storage VM Architecture Guide", https://www.hds.com/en-us/pdf/white-paper/hitachi-architecture-guide-hus-vm.pdf, 31 pages, Oct. 2013 (31 pages).

\* cited by examiner

CONFIGURING NEW NODES FOR USING A STORAGE SYSTEM MANAGED BY A UNIFIED STORAGE MANAGER

TECHNICAL FIELD

The disclosure is generally related to data storage management, and is more specifically related to configuring new nodes for using a storage system managed by a unified storage manager.

BACKGROUND

Computing environments often include storage management functionality for managing storage solutions. Growth of data in many industries is overwhelming hardware-based storage. Software-defined storage platforms provide a solution for scaling storage across physical, virtual, and cloud resources. There are various storage providers that can be used for software-based storage services. These storage providers have different features and properties. Currently, configuring machines to work within particular storage environments can be a complicated and error-prone task, entailing knowledge of the specific features of the underlying storage service.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for configuring new nodes for using a storage system managed by a unified storage manager (USM). The USM is a storage management application that provisions, manages, and monitors multiple disparate storage providers. A storage provider may also be referred to herein as a storage service, and may include a scalable file system such as Gluster® file system, Ceph® file system, or any other scalable, distributed software-based storage service. The USM is designed so that the underlying machines used as storage nodes for the storage services may be automatically configured for use by the USM's storage services with little to no user intervention.

In one implementation, a provisioning layer of the USM enables the configuration of new storage nodes for use by the storage systems managed by the USM. The USM may include a USM provisioning layer that is responsible for provisioning storage nodes for use by storage services managed by the USM. The provisioning layer may include a provisioning component that handles providing new storage nodes with an operating system, file system, and storage software packages to implement storage services of a storage provider. In one implementation, USM provision layer enables provisioning a storage node through external provisioning systems. The USM provisioning layer provides a loosely-coupled, pluggable architecture so that external provisioning systems can be easily added or removed without affecting the core functionality of the USM. The USM is designed so that the external provisioning system implements the business logic specific to the provisioning technology areas. Each external provisioning system may communicate with the USM provision layer via plugins corresponding to the external provision system.

Conventional storage system solutions rely on manual configuration of storage nodes for addition to or removal from the storage management system. In addition, as part of the conventional storage system solutions, a system administrator should be knowledgeable of the provisioning process, features of the underlying storage provider systems, and how adding or removing a storage node affects the entire storage management system. This is a complicated and error-prone task. Implementations of the disclosure provide a provisioning component of a USM that automatically configures a new storage node for use by storage systems managed by the USM with little to no user intervention.

Figure 1:
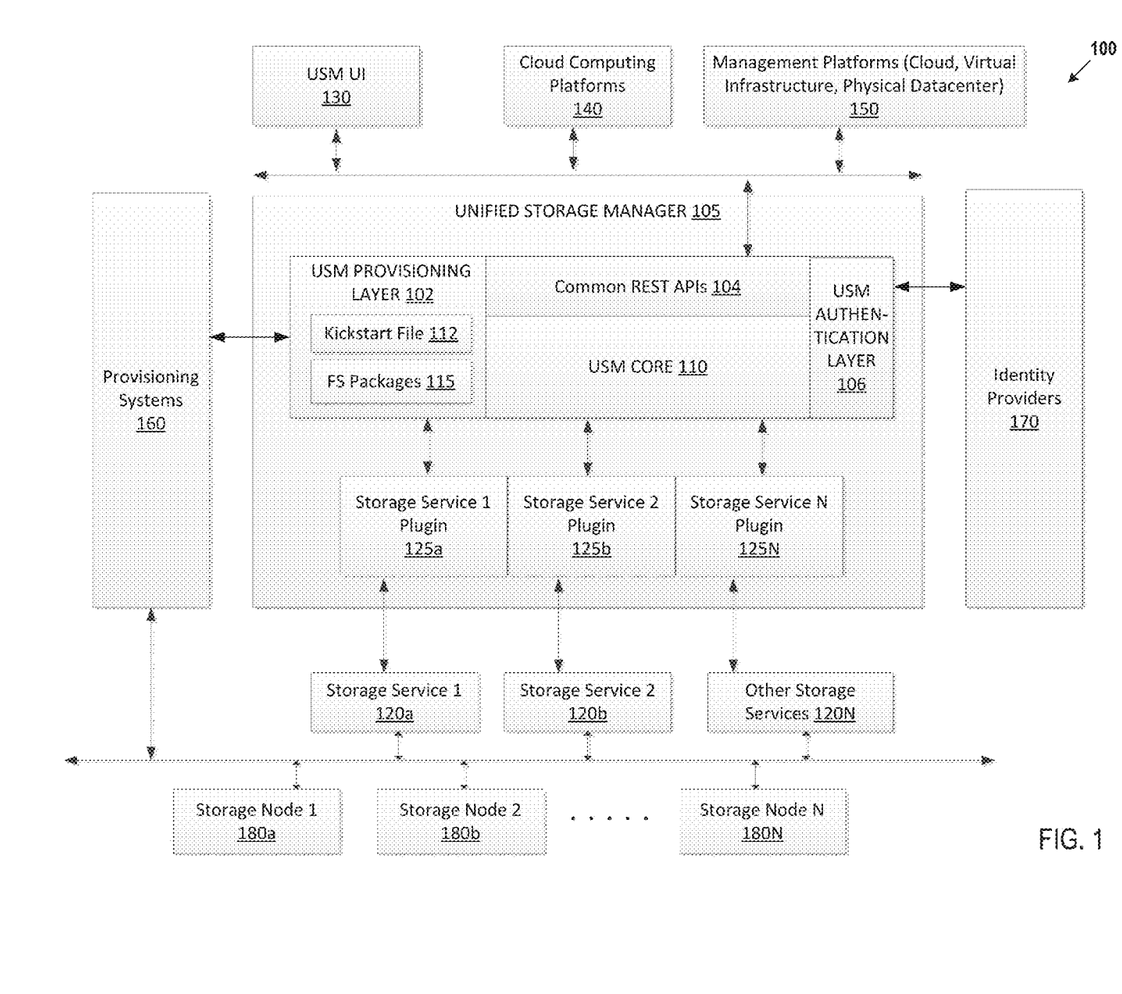
FIG. 1 depicts a high-level diagram of an example system architecture for a unified storage manager (USM) operating in accordance with one or more aspects of the disclosure.

FIG. 1 is an example system architecture 100 in which implementations of the disclosure can be implemented. The system architecture 100 can include a unified storage manager (USM) 105. The USM 105 can be implemented on one or more machines (e.g., server computers, desktop computers, etc.). The USM 105 deploys, manages, and monitors multiple different storage providers. Example storage providers can include Gluster® file system (FS), Ceph® storage, and so on. Storage providers may be referred to herein as storage services. As illustrated in FIG. 1, USM 105 is communicably coupled to multiple storage services, such as storage service 1 120a, storage service 2 120b, and other storage services 120N corresponding to the storage providers. The storage providers 120a-120N utilize storage nodes 180a-180N to provide the underlying storage services. A storage node 180a-180N may be a physical computing machine with its own local persistent storage, either disk or solid state, and may also include a CPU with one or more cores, memory, and an Internet Protocol (IP) address. Storage nodes may be provisioned to provide storage for a storage service, such as any of storage services 120a-120N, managed by the USM 150. Storage nodes 180a-180N may be part of one or more logical resources (e.g., cluster, volume, block, disk, brick, etc.) of the storage service 120a-120N to which the storage node 180a-180N is provisioned.

USM 105 may be communicably coupled to storage services 120a-120N and their underlying storage nodes 180a-180N, as well as to other external providers (e.g., external provisioning systems 160, external identity providers 170, etc.) via a communication interface such as a bus or a network. The network may be a private network (e.g., a local area network (LAN), a wide area network (WAN), intranet, or other similar private networks) or a public network (e.g., the Internet).

The USM 105 provides a pluggable framework to allow for interaction with each of the storage services 120a-120N. A pluggable framework refers to the USM 105 providing plugin components 125a-125N that communicate (e.g., via remote procedure calls (RPC) application programming interfaces (APIs)) with the corresponding storage services 120a-120N. A plugin refers to a component that adds a specific feature to an existing computer program. The USM 105 provides services that the plug-in 125a-125N can use, including a way for the plugin 125a-125N to register itself with the USM 105 and a protocol for the exchange of data with the plugin 125a-125N. In some implementations, plugin component 125a-125N is referred to as an adaptor component that generally refers to a device (which may be implemented as executable code, hardware, etc.) that enables normally incompatible components to work together.

USM 105 exposes application programming interfaces (APIs) 104, such as Representational State Transfer (REST) APIs 104, which are consumed via USM user interface (UI) 130 and by other USM 105 customers, such as cloud computing platforms 140 and other management platforms 150. One example cloud computing platform 140 may include Red Hat® OpenStack®. An example management platform 150 may include Red Hat® CloudForms®. USM 105 implements all framework-level functionalities such as authentication, authorization logging, and so on.

USM 105 includes a USM core 110 that manages storage services 120a-120N and the use of the storage nodes 180a-180N by the storage services 120a-120N. For example, USM core 110 manages configuration of storage nodes 180a-180N through providers of storage services 120a-120N. Generic APIs, such as host management, authentication, and authorization, are implemented in the USM core 110. However, provider-specific API requests are routed to the respective providers of storage services 120a-120N via the corresponding storage service plugins 125a-125N for those storage services 120a-120N.

USM 105 also includes a USM authentication layer 106 that is responsible for identifying individuals in a system and controlling their access to resources within or across enterprise boundaries by associating user rights and restrictions with the established individual. The USM authentication layer 106 enables identity management through external identity providers 180, such as IPA®, OpenLDAP®, Directory Server®, and AD®, to name a few examples. The USM authentication layer 106 and the external identity providers 170 may communicate via APIs. USM 105 provides a pluggable framework through which any external identity provider can be integrated.

In one implementation, USM 105 includes a USM provisioning layer 102 that is responsible for provisioning storage nodes 180a-180N for use by the storage services 120a-120N. The provisioning layer 102 handles providing new storage nodes 180a-180 being added to the USM system 100 with operating system, file system, and storage software packages to implement storage services of a storage provider. USM provision layer 102 enables provisioning a storage node 180a-180N through external provisioning systems 160. External provisioning systems 160 may include, but are not limited to, Satellite® provisioning system, Puppet® provisioning system, Mariner® provisioning system, and Foreman® provisioning system, to name a few examples.

In one implementation, USM provisioning layer 102 enables the addition and/or removal of provisioning systems 160 to the USM 105. The USM 105 provides a loosely-coupled, pluggable architecture so that provisioning system 160 can be easily added or removed without affecting the core functionality of the USM 105. The USM 105 is designed so that the external provisioning system 160 implements the business logic specific to the provisioning technology areas. Each external provisioning system 160 may communicate with the USM provision layer 102 via plugins corresponding to the external provision system 160.

The USM 105 may detect when a new machine is connected to the USM system 100. In some implementations, an indication (e.g., via USM UI 130) may be received that a user intends to add a new machine as a storage node 180a-180N to the USM system 100. The indication may include identification of the new machine, such as a communication address to communicate files to the machine. In other implementations, the new machine may be detected when a network connection is made between the new machine and the USM system 105.

When a new machine is detected, the USM core 100 may invoke the USM provisioning layer 102 to manage the process for configuring the new machine for use as a storage node 180a-180N of the USM system 100. USM provisioning layer 102 may utilize an external provisioning system 160 to manage a provisioning process for the new machine. The USM provisioning layer 102 and the external provision systems 160 may communicate via APIs provided by plugins (or in some cases, drivers) installed in the USM 105.

The new machine typically may arrive in a "bare metal" state. A bare metal state refers to a computing device connected to a network without an operating system installed or other repository configurations provided. When a new machine is provided in a "bare metal" state, the USM provisioning layer 102, via external provisioning system 160, may cause an operating system (OS) to be installed on the new machine. This OS may be a bare OS that provides minimal options and configurations. As part of installation of the OS, a kickstart file 112 is launched on the machine. The kickstart file 112 contains instructions, which, when executed, cause a handshake to occur with the USM 105 to enable communication between the USM 105 and the new machine. A handshake refers to an automated process of negotiation that dynamically sets parameters of a communications channel established between two entities before normal communication over the channel begins. Once the communication channel is established between the new machine and the USM 105, the new machine can present itself as an available node for the USM 105 to utilize as part of the managed storage services 120a-120N of the USM 105.

When the USM core 110 determines to accept an available node, the new machine may communicate its capabilities (e.g., disk space, memory size, processing speed, CPU, networking configurations, etc.) to the USM core 105. This information is stored by the USM 105 as infrastructure information in a data store maintained by the USM 105. The new machine may then be considered a storage node 180a-180N that can be utilized by USM 105 for storage service 120a-120N purposes. The USM 105 may then select the storage node 180a-180N for use with an underlying storage service 120a-120N. For example, the storage node 180a-180N may be used as part of a cluster creation process for a storage service 120a-120N.

As part of creating a new cluster, the USM provisioning layer 102 may determine a type of cluster that the storage node 180a-180N is place in. Based on the cluster type, the USM provisioning layer 102 may cause one or more file system packages 115 corresponding to the storage service 120a-120N to be installed on the storage node 180a-180N. The installed file system packages 115 enable the storage node 180a-180N to provide services for the storage services 120a-120N according to the assigned cluster type of the storage node 180a-180N. Further description of the USM provisioning layer 102 and the configuration of storage nodes 180a-180N by the USM provisioning layer 102 is provided below with respect to FIG. 2

Figure 2:
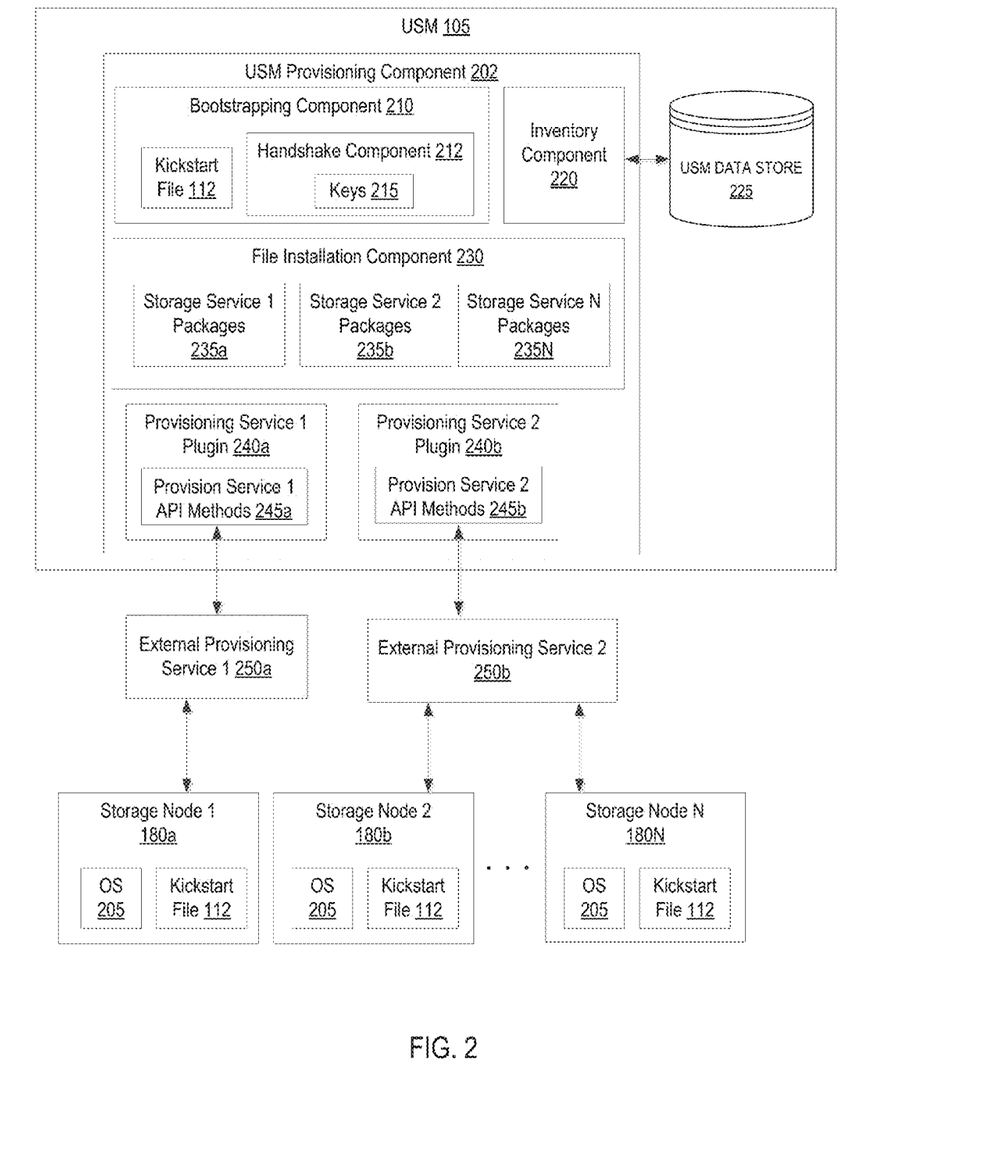
FIG. 2 schematically illustrates an example functional structure of a provisioning component of a USM architecture, in accordance with one or more aspects of the disclosure.

FIG. 2 is a block diagram of a USM and a provisioning component of the USM according to implementations of the disclosure. In one implementation, the USM 105 is the same as its counterpart describe with respect to FIG. 1. In addition, in one implementation, USM provisioning component 202 (also referred to herein as provisioning component 202) is the same as USM provisioning layer 102 described with respect to FIG. 1. Provisioning component 202 may be communicably coupled to storage nodes 180a-180N, which may be the same as their counterparts described with respect to FIG. 1. Provisioning component 202 may further be communicably coupled to a USM data store 225. USM data store 225 may be a memory (e.g., random access memory), a cache, a drive (e.g., a hard drive), a flash drive, a database system, or another type of component or device capable of storing data. The USM data store 225 may also include multiple storage components (e.g., multiple drives or multiple databases) that may also span multiple computing devices (e.g., multiple server computers).

In one implementation, the components within USM 105 and USM provisioning component 202 may be communicably coupled directly or via a network. Similarly, USM 105 may be communicably coupled to external provisioning services 250a-250b and/or storage nodes 180a-180N directly or via a network. In one implementation, the network may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, USM provisioning component 202 includes a bootstrapping component 210, an inventory component 220, a file installation component 230, and one or more provisioning service plugins 240a, 240b. As discussed above, the USM provisioning component 202 manages the configuration of new storage nodes 180a-180N for use by storage services managed by USM 105. USM provision component 202 enables provisioning a storage node 180a-180N through one or more external provisioning systems 250a-250b. In one implementation, external provisioning system 250a-250b may be the same as provisioning systems 160 described with respect to FIG. 1.

USM provisioning component 202 enables the addition and/or removal of external provisioning systems 160 to the USM 105 via a loosely-coupled, pluggable architecture. The provisioning component 202 may execute provisioning service plugins 240a-240b that each correspond to an external provisioning system 250a-250b. A plugin refers to a component that adds a specific feature to an existing host application. Plugins provide a protocol for the exchange of data with a service associated with the plugin. The provisioning service plugins 240a-240b includes an API interface 245a-245b that enables communication between the provisioning component 202 and the external provisioning server 250a-250b. The use of provisioning service plugins 240a-240b allow external provisioning systems 250a-250b to be easily added or removed without affecting the core functionality of the USM 105. The USM 105 and provisioning component 202 are designed so that the external provisioning system 250a-250b implements the business logic specific to the provisioning technology areas.

The provisioning component 202 handles providing new storage nodes 180a-180 being added to the USM system 100 with an operating system, a file system, and storage software packages to implement storage services of a storage provider. The USM 105 may detect when a new machine (e.g., storage node 180a-180N) is connected to the USM system. In some implementations, an indication may be received that a user intends to add a new machine as a storage node 180a-180N to the USM system. The indication may include identification of the new machine, such as a communication address to transmit files to the machine. In other implementations, the new machine may be detected when a network connection is made between the new machine and the USM system.

When a new machine is detected, the USM provisioning component 202 is invoked by USM 105 to manage the process for configuring the new machine for use as a storage node 180a-180N of the USM system. In one implementation, provisioning component 202 utilizes an external provisioning system 250a-250b to manage a provisioning process for the new machine. If more than one external provisioning system 250a-250b is associated with the provision component 202 via provisioning service plugins 240a-240b, then configuration parameters of the provisioning component 202 and/or a system administrator indication may determine which external provisioning system 250a-250b to utilize.

The USM provisioning component 202, via external provisioning system 160, may cause an operating system (OS) to be installed on the new machine. This OS may be a bare OS that provides minimal options and configurations. The bootstrapping component 210 of USM provisioning component 202 may communicate with external provisioning service 250a-250b, via provisioning service API methods 245a-245b of provisioning service plugins 240a-240b, to cause the OS to be installed on the new machine (i.e., storage nod 180a-180N). In one implementation, bootstrapping refers to a self-starting process that proceeds without external input. For example, bootstrapping may refers to the process of loading basic software into memory of a computer after power-on or general reset, which then takes care of loading other applications as needed.

As part of the installation of the OS, bootstrapping component 210 provides a kickstart file 112 to the new machine, via the external provisioning service 250a-250N. The kickstart file 112 may be provided as part of the OS files 205 provided to the new machine. The kickstart file 112 is then executed on the machine as part of the OS installation process. The kickstart file 112 causes a handshake to occur with the USM 105 to enable communication between the USM 105 and the new machine. Handshake component 212 may perform the process of a handshake for bootstrapping component 210. A handshake refers to an automated process of negotiation that dynamically sets parameters of a communications channel established between two entities before normal communication over the channel begins. As part of the handshake process, the handshake component 212 and the storage node 180a-180N exchange keys 215 to provide a security element for the USM provisioning component 202 and storage node 180a-180N. Keys 215 may include a piece of information (parameter) that determines the functional output of a cryptographic algorithm. Keys 215 may specific transformations in cryptographic algorithms, such as digital signature schemes and message authentication codes.

Once the communication channel is established between the new machine and the USM 105, the new machine can present itself as an available node for the USM 105 to utilize as part of the managed storage services 120a-120N of the USM 105. When the USM core 110 determines to accept an available node, the new machine may communicate its capabilities (e.g., disk space, memory size, processing speed, etc.) to the inventory component 220. In one implementation, the inventor component 220 may request capability information from the storage node 180a-180N. The inventory component 220 causes the received capability information to be as infrastructure data in USM data store 225.

When the new machine is included as part of the USM inventory in USM data store 225, the new machine may then be regarded as a storage node 180a-180N that can be utilized by USM 105 for storage service purposes. The USM 105 may then select the storage node 180a-180N for use with an underlying storage service managed by USM 105. For example, the storage node 180a-180N may be used as part of a cluster creation process for a storage service.

The USM 105 may notify the provisioning component 202 that a storage node 180a-180N is to be provisioned as part of a storage service cluster. In one implementation, the USM 105 communicates configuration information such as the storage node 180a-180N identifier (ID), the storage service type or ID, a cluster type, and so on. As part of creating a new cluster, the file installation component 230 may determine a type of cluster that the storage node 180a-180N is to be provisioned in (e.g., utilizing configuration information provided by the USM 105 to the provisioning component 202).

Based on the identified cluster type, the file installation component 230 may cause one or more storage service packages 235a-235N to be installed on the identified storage node 180a-180N. The storage service packages 235a-235N may be maintained by the provisioning component 202 and enable the storage node 180a-180N to provide services specific to the storage services. The file installation component 230 uses the storage service packages 235a-235N to start the storage service and initialize configurations for the storage service on the storage node 180a-180N. The storage service packages 235a-235N for each storage service contains basic information about the storage service and the technology-specific routes (i.e., endpoints) it supports. Example storage service package are shown below as data models. Data models represent the structure of the resources (i.e., storage nodes 180a-180N) managed by USM 105. The common data models for unified APIs are listed below. For the technology-specific APIs, it is the responsibility of the implementer to define the data models. As shown below, JavaScript Object Notation (JSON) format is used for the data modeling. Implementers may convert JSON format modeling into specific data structures.

Storage Nodes

The data model proposed for the storage nodes are as below:

```
{
"title": "Node",
"description": "Represents the data model for a storage node",
"type": "object",
"properties": {
"nodeid": {
"description": "The unique identifier for a Node",
"type": "UUID"
},
"hostname": {
"description": "Name of the Node",
"type": "string"
},
"tags": {
"type": "array",
"description": "User description",
"items": {
"type": "string"
}
},
"management_ip4": {
"description": "Management IP Address of the storage Node",
"type": "string"
},
"cluster_ip4": {
"description": "Cluster IP Address of the node to talk to other nodes in cluster",
"type": "string"
},
"public_ip4": {
"description": "Public IP Address of the node for external access",
"type": "string"
},
"clusterid": {
"description": "Id of the cluster where the node belongs to",
"type": "string"
},
"location": {
"description": "Location information of the node",
"type": "string"
},
"status": {
"description": "Status of the storage node",
"type": "string"
},
"options": {
"description": "Vendor specific parameters if any are placed here",
"type": "object",
"properties": { }
},
"cpus": {
"type": "array",
"description": "CPU information of the node",
"items": {
"type": "cpu"
}
},
"network_info": {
"description": "Network information of the node",
"type": "object"
},
"storage_disks": {
"type": "array",
"description": "Physical disks of the node",
"items": {
"type": "Disk"
}
},
"memory": {
"type": "array",
"description": "Memory information of the node",
"items": {
"type": "memory"
```

}
},
"os": {
"description": "OS information of the node",
"type": "object"
},
"enabled": {
"description": "Administrative Status of the storage node which says if node is enabled or not for management",
"type": "string"
}
},
"required": [
"node_id",
"hostname",
"management_ip",
"node_status"
]
}

Storage Cluster

The data model proposed for the storage clusters are as below:
"title": "Cluster",
"description": "Represents the data model for a storage cluster",
"type": "object",
"properties": {
"clusterid": {
"description": "The unique identifier for a Cluster",
"type": "UUID"
},
"name": {
"description": "Name of the Cluster",
"type": "string"
},
"tags": {
"type": "array",
"items": {
"type": "string"
}
},
"compat_version": {
"description": "Storage software compatibility version",
"type": "string"
},
"type": {
"description": "Type of the storage cluster, ex. Ceph,Gluster etc",
"type": "string"
},
"storagetype": {
"description": "Type of the storge, ex. File, block etc.",
"type": "string"
},
"workload": {
"description": "Type of workload, openstack, File Streaming etc.",
"type": "string"
},
"status": {
"description": "Status of the storage cluster",
"type": "string"
},
"options": {
"description": "Vendor specific parameters if any are placed here",
"type": "object",
"properties": { }
},
"openstack_sevices": {
"type": "array",
"items": {
"type": "string"
}
},
"enabled": {
"description": "Administrative Status of the cluster which says if the cluster is enabled or not",
"type": "string"
}
},
"required": [
"cluster_id",
"cluster_name",
"cluster_type",
"storage_type",
"workload",
"cluster_status"
]
}

Storage Pool/Volume

The data model proposed for the storage pool/volume is as below:
{
"title": "Storage",
"description": "Represents the data model for storage pool/volume",
"type": "object",
"properties": {
"storageid": {
"description": "The unique identifier for a storage pool/volume",
"type": "UUID"
},
"name": {
"description": "Name of the carved out storage",
"type": "string"
},
"type": {
"description": "Type of the carved out storage ec, replicated etc",
"type": "string"
},
"tags": {
"type": "array",
"description": "User description",
"items": {
"type": "string"
}
},
"clusterid": {
"description": "Id of the cluster where the storage belongs to",
"type": "string"
},
"size": {
"description": "Size of the carved out storage",
"type": "string"
},
"status": {
"description": "Status of the storage",
"type": "string"
},
"options": {

```
"description": "Vendor specific parameters if any are placed
   here",
"type": "object",
"properties": { }
}
},
"required": [
"storage_id",
"storage_name",
"cluster_id",
"status"
]
}
```

Storage Logical Unit

The data model proposed for the storage logical unit (LUN) is as below:

```
{
"title": "Storage Logical unit",
"description": "Represents the data model for a storage
   Logical Units",
"type": "object",
"properties": {
"sluid": {
"description": "The unique identifier of a storage logical
   unit",
"type": "UUID"
},
"name": {
"description": "Name of the storage logical unit",
"type": "string"
},
"type": {
"description": "Name of the storage unit",
"type": "string"
},
"clusterid": {
"description": "Id of the cluster",
"type": "string"
},
"nodeid": {
"description": "Id of the physical node",
"type": "string"
},
"storageid": {
"description": "The unique identifier for a storage pool/
   volume",
"type": "UUID"
},
"storagedeviceid": {
"description": "Id of the underlying physical storage
   device",
"type": "string"
},
"status": {
"description": "Status of the storage logical unit",
"tslu_statusype": "string"
},
"options": {
"description": "Vendor specific parameters if any are placed
   here",
"type": "object",
"properties": { }
}
},
"required": [
"slu_id",
"node_id",
"storage_device_id",
"slu_status"
]
}
```

Figure 3:
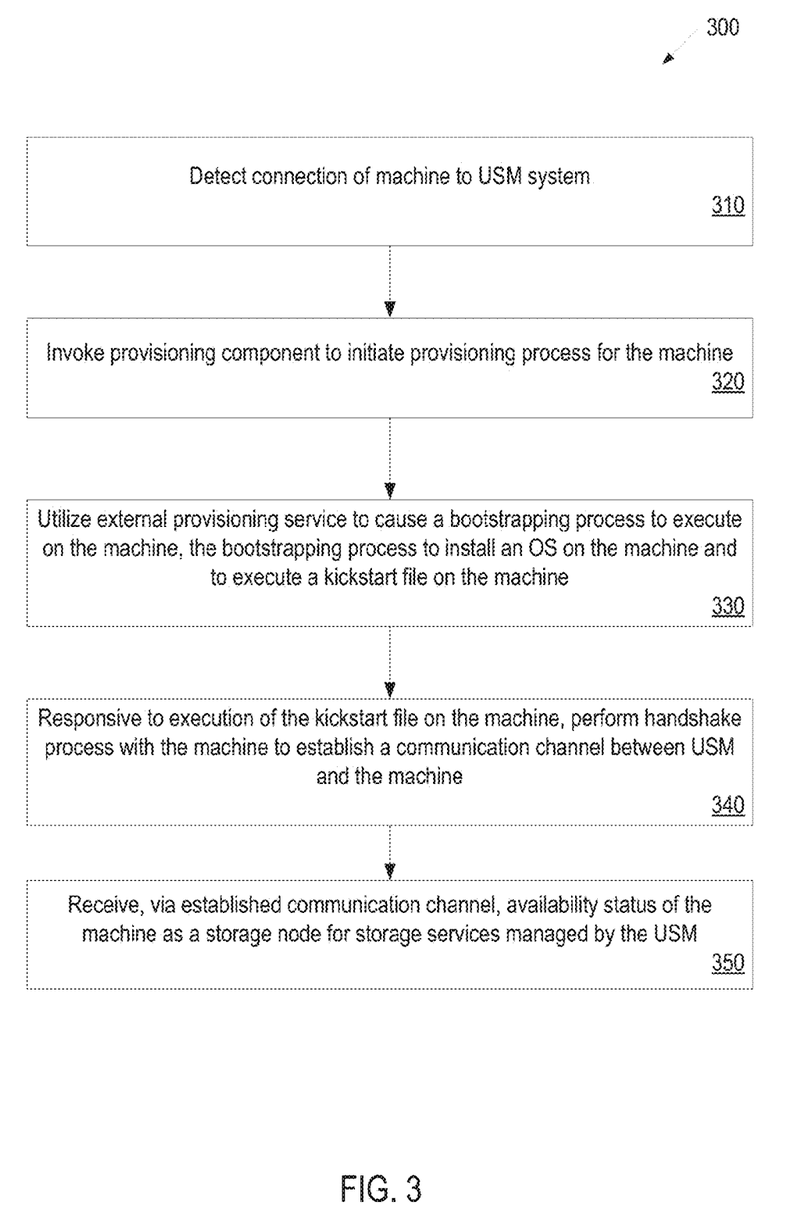
FIG. 3 depicts a flow diagram of a method for configuring new nodes for using a storage system managed by a USM, in accordance with one or more aspects of the disclosure.
Figure 4:
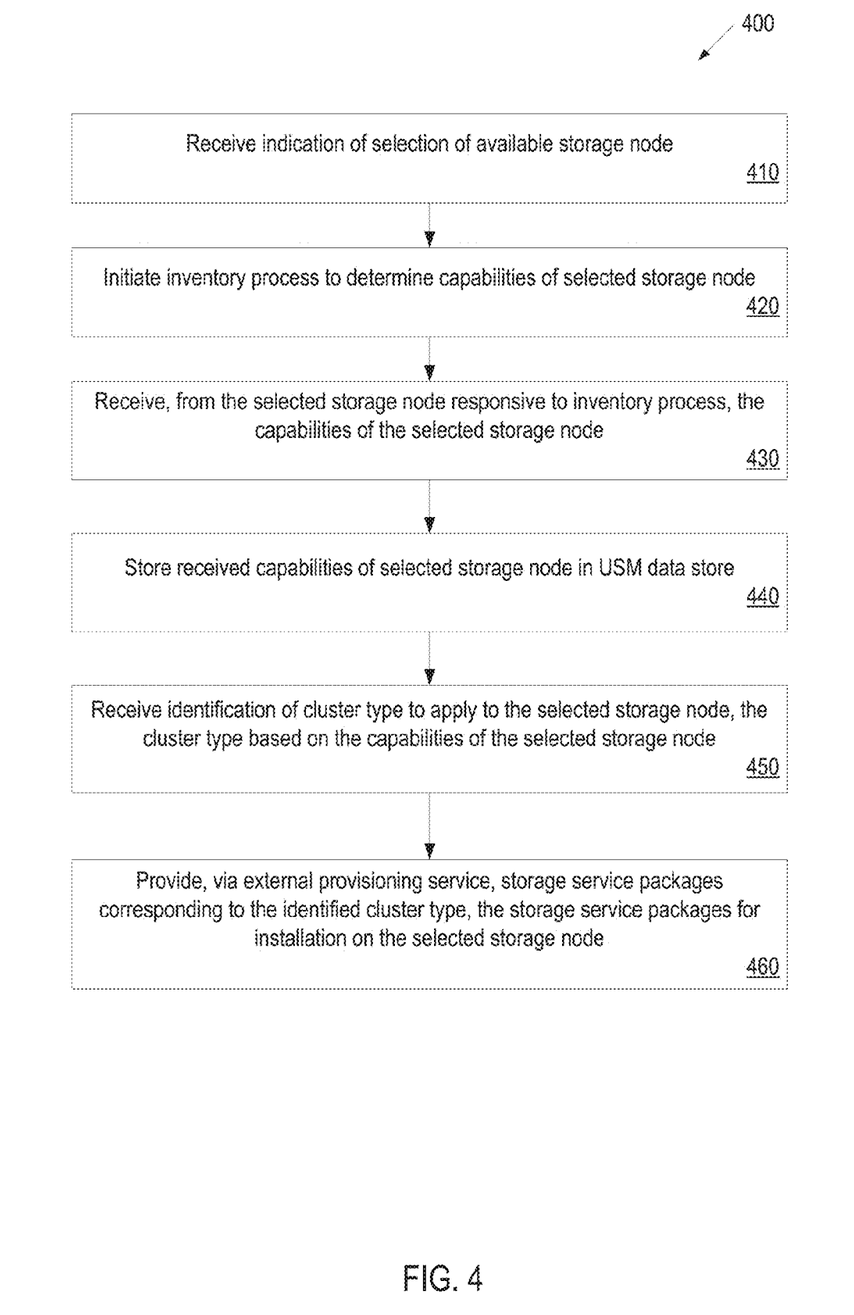
FIG. 4 depicts a flow diagram of another method for configuring new nodes for using a storage system managed by a USM, in accordance with one or more aspects of the disclosure.

FIGS. 3 and 4 depict flow diagrams for illustrative examples of methods 300 and 400 for configuring new nodes for using a storage system managed by a USM. Method 300 includes a method of provisioning a newly-detected machine in the USM. Method 400 includes a method of provisioning storage service packages for a newly-provisioned storage node in a USM. Methods 300 and 400 may be performed by processing devices that may comprise hardware (e.g., circuitry, dedicated logic), computer readable instructions (e.g., run on a general purpose computer system or a dedicated machine), or a combination of both. Processing devices may be communicably coupled to memory, storing instructions of methods 300 and 400, to be executed by the processing devices.

Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing devices implementing USM 105, and specifically USM provisioning component 202, as shown in FIGS. 1 and 2.

Referring to FIG. 3, method 300 may be performed by processing devices of a computing device and may begin at block 302. At block 310, a processing device may detect a connection of a machine to the USM system. The connection may be detected via identification of a network connection request from the machine and/or from receipt of a manual request to add the machine to the USM. At block 320, a provisioning component of the USM is invoked to initiate a provisioning process for the machine. At block 330, an external provisioning service is utilized to cause a bootstrapping process to execute on the machine. The bootstrapping process is to install an OS on the machine and to execute a kickstart file on the machine. The kick start file includes instructions that, when executed by the machine, cause a handshake process to occur with the USM to enable communication between the USM and the machine.

At block 340, a handshake process is performed responsive to execution of the kickstart file on the machine. In one implementation, the handshake process comprises an automated process of negotiation that dynamically sets parameters of the communication channel. The handshake process establishes a communication channel between the USM and the machine. Lastly, at block 350, an availability status of the machine is received, via the communication channel. The availability status indicates that the machine is available as a storage node for one or more storage services that are managed by the USM.

Referring to FIG. 4, method 400 may be performed by processing devices of a computing device and may begin at block 402. At block 410, a processing device may receive an indication of a selection of an available storage node. In one implementation, the available storage node has been provisioned as a USM storage node by a provisioning component of the USM. At block 420, an inventory process is initiated to determine capabilities of the selected storage node. The capabilities may include, but are not limited to, CPU of the machine, disk space data of the machine, memory space data of the machine, or networking configuration data of the machine.

At block 430, the capabilities are received from the selected storage node responsive to the inventory process. At block 440, the received capabilities are stored in a data store of the USM. Subsequently, at block 450, identification of a cluster type to apply to the selected storage node is received. In one implementation, the identification of the cluster type may be received from a core of the USM. The identified cluster type of the selected storage node may be based on the received and stored capabilities of the selected storage node. Lastly, at block 460, storage service packages are provided, via an external provisioning service of the provisioning component, to the selected storage node. In one implementation, the storage service packages are for installation on the selected storage node. Once installed on the selected storage node, the storage service packages enable the selected storage node to provide services for one of the storage service managed by the USM.

Figure 5:
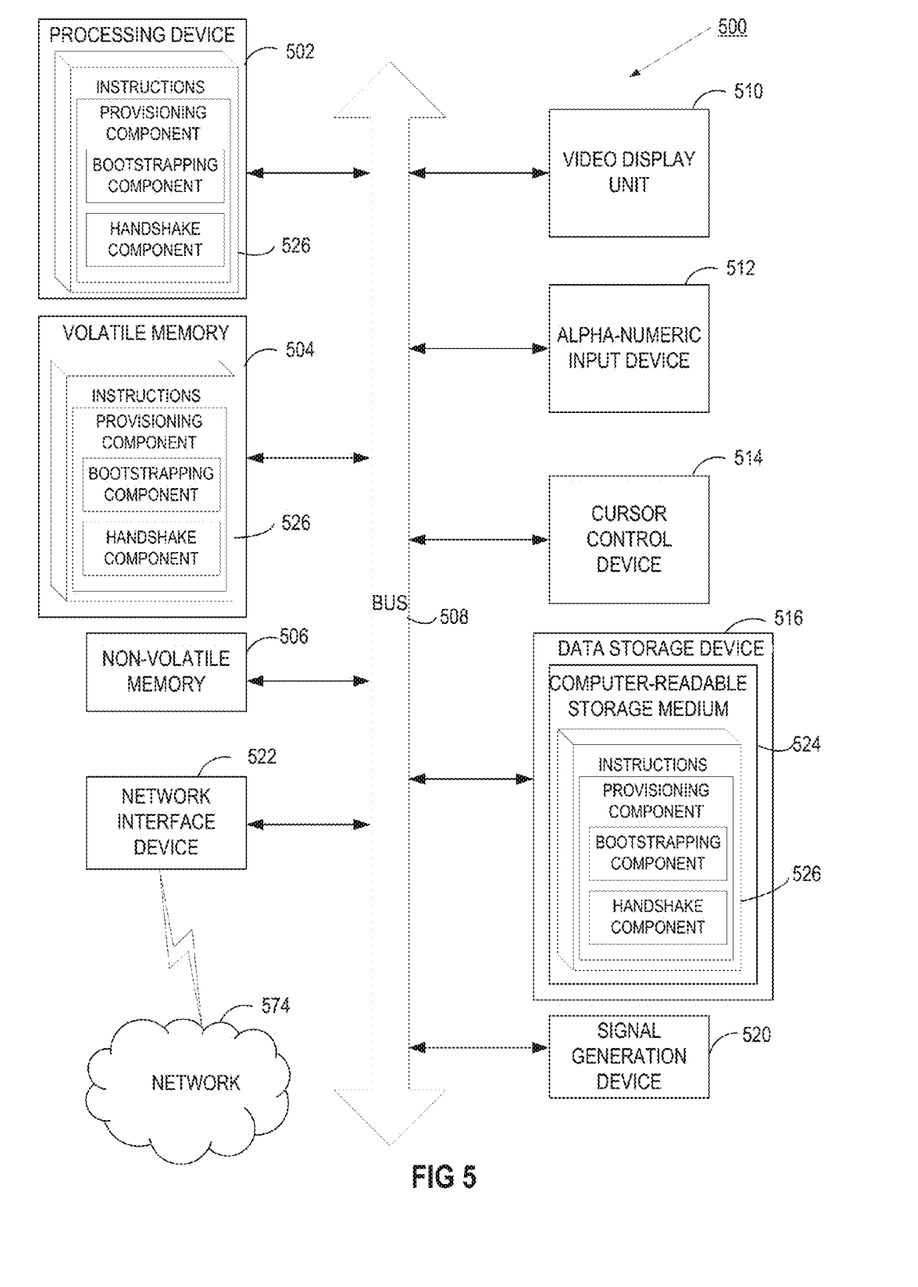
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to a computing device within system architecture 100 or USM 105 of FIG. 1 and FIG. 2 respectively. The compute system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for a provisioning component 202, bootstrapping component 210, and handshake component 212 of FIG. 2 for implementing methods 300 or 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
   detecting, by a processing device executing a unified storage manager (USM), a connection of a machine to the USM;
   invoking a provisioning component of the USM to initiate a provisioning process for the machine;
   utilizing, by the processing device via the provisioning process, an external provisioning service to cause a bootstrapping process to execute on the machine, the bootstrapping process to install an operating system (OS) on the machine and to execute a kickstart file on the machine;
   responsive to execution of the kickstart file, performing, by the processing device, a handshake process with the machine to establish a communication channel between the USM and the machine; and
   receiving, via the established communication channel, an availability status of the machine as a storage node for storage services managed by the USM.

2. The method of claim 1, wherein the kickstart file comprises instructions that, when executed by the machine, cause a handshake to occur with the USM to enable communication between the USM and the machine, and wherein a handshake comprises an automated process of negotiation that dynamically sets parameters of the communication channel.

3. The method of claim 1, wherein the handshake process comprises exchanging one or more keys between the machine and the USM in order to establish the communication channel.

4. The method of claim 1, wherein detecting the connection of the machine comprises receiving a network connection request from the machine.

5. The method of claim 1, wherein detecting the connection of the machine comprises receiving an indication of a manual request to connect the machine to the USM.

6. The method of claim 1, further comprising:
   receiving an indication of selection of the machine as a storage node;
   initiating an inventory process to determine capabilities of the machine;
   receiving, from the machine response to the inventory process, the capabilities of the machine; and
   storing the received capabilities in a data store of the USM.

7. The method of claim 6, further comprising:
   receiving an identification of a cluster type to apply to the machine;
   identifying storage service packages associated with the identified cluster type, the storage service packages maintained by the provisioning component; and
   causing the external provisioning service to install the identified storage service packages on the machine for the machine to operate as a storage node for one of the storage services associated with the storage service packages.

8. The method of claim 7 wherein the cluster type is based on the capabilities of the machine.

9. The method of claim 1, wherein the capabilities comprise at least one of CPU data of the machine, disk space data of the machine, memory space data of the machine, or networking configuration data of the machine.

10. The method of claim 1, wherein the external provisioning service communicates with the provisioning component via application programming interfaces (APIs) provided via a plugin installed in the provisioning component.

11. A system comprising,
    a memory; and
    a processing device communicably coupled to the memory, the processing device to:
    detect a connection of a machine to a unified storage manager (USM) executed by the processing device;
    invoke a provisioning component of the USM to initiate a provisioning process for the machine;
    utilize, via the provisioning process, an external provisioning service to cause a bootstrapping process to execute on the machine, the bootstrapping process to install an operating system (OS) on the machine and to execute a kickstart file on the machine;
    perform a handshake process with the machine to establish a communication channel between the USM and the machine, the handshake process initiated by execution of the kickstart file at the machine;
    receive, via the established communication channel, an availability status of the machine as a storage node for storage services managed by the USM.

12. The system of claim 11, wherein the kickstart file comprises instructions that, when executed by the machine, cause a handshake to occur with the USM to enable communication between the USM and the machine, and wherein a handshake comprises an automated process of negotiation that dynamically sets parameters of the communication channel.

13. The system of claim 11, wherein the handshake process comprises exchanging one or more keys between the machine and the USM in order to establish the communication channel.

14. The system of claim 11, further comprising:

receiving an indication of selection of the machine as a storage node;

initiating an inventory process to determine capabilities of the machine;

receiving, from the machine response to the inventory process, the capabilities of the machine; and storing the received capabilities in a data store of the USM.

15. The system of claim 14, further comprising:

receiving an identification of a cluster type to apply to the machine;

identifying storage service packages associated with the identified cluster type, the storage service packages maintained by the provisioning component; and causing the external provisioning service to install the identified storage service packages on the machine for the machine to operate as a storage node for one of the storage services associated with the storage service packages.

16. The system of claim 11, wherein the external provisioning service communicates with the provisioning component via application programming interfaces (APIs) provided via a plugin installed in the provisioning component.

17. A non-transitory machine-readable storage medium storing instructions that cause a processing device to:

receive an indication of a selection of an available storage node, the available storage node provisioned by a provisioning component of a unified storage manager (USM) executed by the processing device;

initiate, by the processing device, an inventory process to determine capabilities of the selected storage node;

receive, from the selected storage node responsive to the inventory process, the capabilities of the storage node;

store the received capabilities of the selected storage node in a data store of the USM;

receive identification of a cluster type to apply to the selected storage node, the identified cluster type based on the capabilities of the selected storage node; and provide, by the processing device via an external provisioning service, storage service packages corresponding to the identified cluster type, the storage service packages for installation on the selected storage node.

18. The non-transitory machine-readable storage medium of claim 17, wherein the capabilities comprise capabilities comprise at least one of CPU data of the machine, disk space data of the machine, memory space data of the machine, or networking configuration data of the machine.

19. The non-transitory machine-readable storage medium of claim 17, wherein the storage service packages enable the selected storage node to provide storage services for a storage provider system managed by the USM.

20. The non-transitory machine-readable storage medium of claim 17, wherein the external provisioning service communicates with the provisioning component via application programming interfaces (APIs) provided via a plugin installed in the provisioning component.

* * * * *